United States Patent [19]

Sonobe et al.

[11] Patent Number: 4,796,993
[45] Date of Patent: Jan. 10, 1989

[54] PHASE MODULATION TYPE FIBER OPTIC GYROSCOPE

[75] Inventors: Hisao Sonobe; Junichi Makino, both of Katsuta; Shigeru Oho, Hitachi; Masahiro Matsumoto; Kouji Kitano, both of Hitachi; Hiroshi Araki, Katsuta, all of Japan

[73] Assignee: Hitachi, Ltd., Tokyo, Japan

[21] Appl. No.: 181,316

[22] Filed: Apr. 13, 1988

[30] Foreign Application Priority Data

Apr. 13, 1987 [JP] Japan .................................. 62-88825
Jun. 18, 1987 [JP] Japan .................................. 62-150235

[51] Int. Cl.⁴ .............................................. G01B 9/02
[52] U.S. Cl. ................................................... 356/350
[58] Field of Search ......................................... 356/350

[56] References Cited
PUBLICATIONS

Böhm et al., "Direct Rotation-Rate Detection with a Fibre-Optic Gyro by Using Digital Data Processing", Electronics Letters, Nov. 10, 1983, vol. 19, No. 23, pp. 997–999.

Primary Examiner—Vincent P. McGraw
Attorney, Agent, or Firm—Antonelli, Terry & Wands

[57] ABSTRACT

An interface signal produces in a phase modulation type fiber optic gyroscope is classified into odd and even groups at a synchronous detector. An angular velocity is processed by the signals of even groups and odd groups.

7 Claims, 4 Drawing Sheets

WAVEFORM OF
SYNCHRONOUS PULSE
VOLTAGE

DEGREE OF HARMONICS

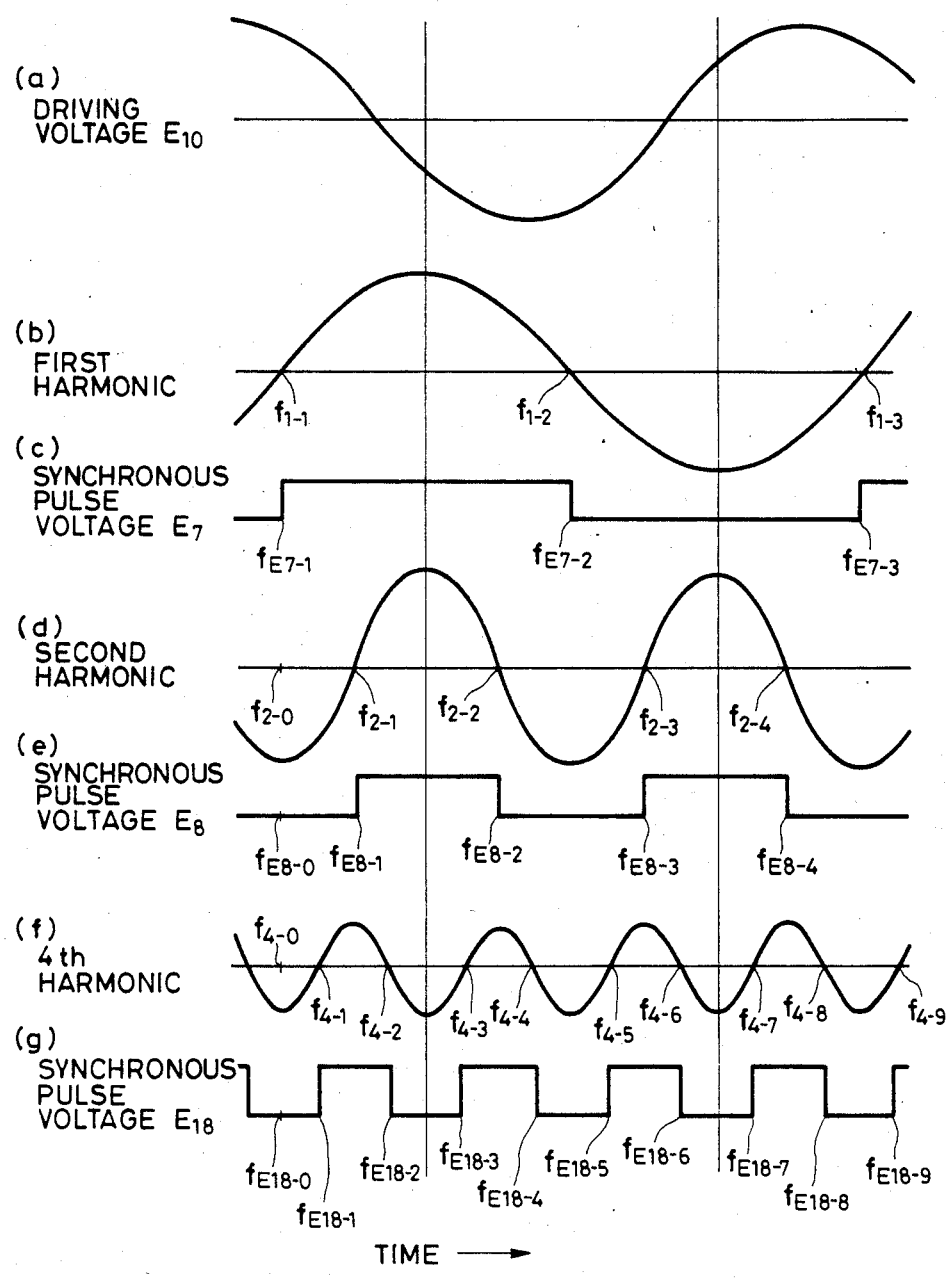

PHASE MODULATION TYPE FIBER OPTIC GYROSCOPE

FIELD OF THE INVENTION

The present invention relates to an optical fiber gyroscope which detects an angular velocity based on an interference of light transferred through an optical fiber loop, more particularly, the present invention relates to a phase modulation type optical fiber gyroscope which is suitable for a navigation system of automobiles.

FIELD OF THE INVENTION

An optical fiber gyroscope has been considered to be useful for a navigation system of vehicles such as automobiles, since it is possible to detect an angular velocity without a moving portion. As a kind of optical fiber gyroscope, there is a phase modulation type fiber gyroscope.

A prior phase modulation type optical fiber gyroscope is introduced in ELECTRONICS LETTERS 10th Nov. 1983 Vol. 19 No. 23 from pages 997 to 999 in the title of "Direct Rotation-Rate Detection with a fiber-optic Gyroscope by using digital processing". According to the prior art, the phase modulation type optical fiber gyroscope realizes high performance by converting an analog signal output from the optical fiber system into a numerical signal, analyzing a wave thereof by a large scale numerical calculator, and processing the calculated result into signals.

In a navigation system of an automobile, although an angular velocity has to be detected in high accuracy, the navigation system of the prior art is not considered on the scale of the numerical calculation portion. Then, when the prior navigation system is demanded to be high accurate and to obtain a quick response velocity, the numerical portion has to be enlarged.

SUMMARY OF THE INVENTION

An object of the present invention is to provide a phase modulation type optical fiber gyroscope of a small size and high performance without using a large scale numerical calculating portion.

The object of the present invention is attained by classifying an output, or an interference, signal of the optical fiber system into one group of odd harmonic components and another group of even harmonic components of phase modulation frequency of a phase modulator and calculating an output angular velocity based on the odd harmonic components and even harmonic components.

BRIEF DESCRIPTION OF THE DRAWINGS

FIG. 5 is a time chart for explaining FIGS. 3 and 4;

DETAILED DESCRIPTION OF THE PREFERRED EMBODIMENTS

Figure 1:
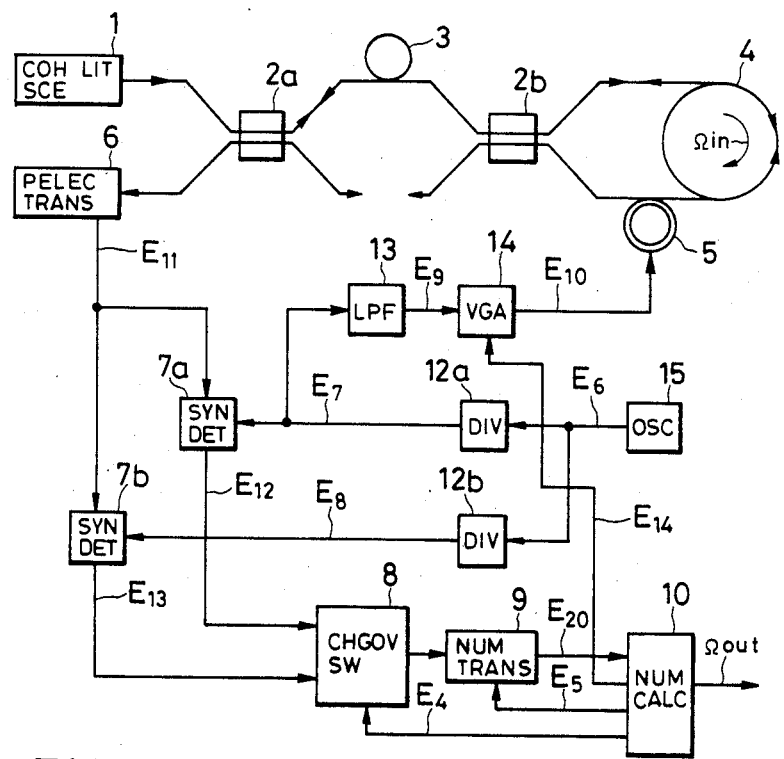
FIG. 1 is a block diagram of one embodiment of a phase modulation type optical fiber gyroscope of the present invention.

Referring to FIG. 1, an optical fiber system comprises a coherence light source 1, couplers 2a, 2b, a polarizer 3, an optical fiber loop, and a phase modulator 5. For instance, the coherence light source 1 is an ordinary laser diode or a super luminescence diode. The couplers 2a, 2b are beam splitter of an optical fiber having evanescent effect. The polarizer 3 is a special wound optical fiber in a coil shape having polarizing characteristic. The optical fiber loop 4 is an optical fiber having a number of hundreds whole length in a coil shape. The phase modulator 5 is formed by winding an optical fiber to an electrostriction element in cylinder shape, and changing light transmitted length by electric signal. The connection between parts and parts is formed by fusion of each optical fiber. The optical fiber is, for instance, polarization maintaining fiber.

The phase modulating type optical fiber gyroscope explained above shows a most representative standard construction, and fitted construction for practicing the present invention. Other portion shown in FIG. 1 is a signal processing portion, and main portion of the present invention.

A photoelectric transfer portion 6 is used for converting light power to voltage, and comprises mainly a photodiode and a current voltage converter. Synchronous detector 7a or 7b comprises a non-inverting amplifier 15, an inverting amplifier 16, a changeover switch 17, and a low-pass filter 18. As apparent from explanation mentioned later, the changeover switch 17, which is enclosed in each synchronous detector 7a, or 7b having a signal gate for inputting the interference signal $E_{11}$ from the photoelectric transfer portion 6, is changed over corresponding to each synchronous pulse voltage, which is applied to the reference input port of each synchronous detector 7a, or 7b, for obtaining the first sensed, or added, value (hereunder, odd harmonic components) comprising odd harmonic components including a fundamental component of the modulation frequency from the synchronous detector 7a, and the second sensed, or added, value (hereunder, even harmonic components) of even harmonic components excluding a direct current component from the synchronous detector 7b. Each odd harmonic component and even harmonic component is smoothed by a low-pass filter 18 to obtain detecting output $E_{12}$ or $E_{13}$.

The changeover switch 8 outputs a number of input signals $E_{12}$ and $E_{13}$, which are obtained in the synchronous detectors 7a, and 7b by weighting of the reference signals $E_7$, and $E_8$, selectively corresponding to an instruction signal $E_4$ from a numeral calculator 10. A numerical transfer portion 9 samples an analog value from the numerical transfer portion 8 corresponding to an instruction signal $E_5$ from the numerical calculator 10. The numerical calculator 10 comprises, for instance, a microcomputer and an input and output interface, outputs an instruction signal to each calculating or other portion, and outputs a numeral output angular velocity $\Omega_{out}$. An oscillator 15 comprises a crystal oscillator. Dividers 12a, and 12b output predetermined synchronous pulse voltages $E_7$, and $E_8$ by dividing an output pulse $E_6$ of the oscillator 15. The oscillator 15, the divider 12a, and the oscillator 15, the divider 12b constitute reference signal generators to the synchronous detectors 7a, and 7b for outputting the reference inputs to the synchronous detectors 7a, and 7b, respectively. A low-pass filter 13 removes all high harmonic components of the synchronous pulse voltage $E_7$ and produces an alternating voltage $E_9$ of a, sinusoidal wave comprising only a fundamental wave component thereof. A voltage gain amplifier of controls an amplitude 14 an alternating voltage $E_9$ from the low-pass filter 13 according to a control signal $E_{14}$ from the numerical calculator 10, and outputs a suitable driving voltage $E_{10}$ to the phase modulator 5.

In the above explained constitution of the phase moduration type fiber optic gyroscope, when the frequency and amplitude of the modulation signal $E_{10}$ are settled to arbitrary values based on the whole length of the optical fiber loop 4, the interference signal, or the distorted alternating output $E_{11}$ out of the photoelectric transfer portion 6 includes every kind of frequency components as follows:

$$A_1 = K_p \sin K_S \Omega_{in} \times J_1 (Km) \quad (1)$$

$$X \cos \omega \left( t - \frac{\tau}{2} \right)$$

$$A_2 = K_p \cos K_S \Omega_{in} \times J_2 (Km) \quad (2)$$

$$X \cos 2\omega \left( t - \frac{\tau}{t} \right)$$

$$A_3 = -K_p \cos K_S \Omega_{in} \times J_3 (Km) \quad (3)$$

$$X \cos 3\omega \left( t - \frac{\tau}{2} \right)$$

$$A_4 = -K_p \cos K_S \Omega_{in} \times J_4 (Km) \quad (4)$$

$$X \cos 4\omega \left( t - \frac{\tau}{2} \right)$$

$$A_5 = K_p \cos K_S \Omega_{in} \times J_5 (Km) \quad (5)$$

$$X \cos 5\omega \left( t - \frac{\tau}{2} \right)$$

$$A_6 = K_p \cos K_S \Omega_{in} \times J_6 (Km) \quad (6)$$

$$X \cos 6\omega \left( t - \frac{\tau}{2} \right)$$

Wherein, $A_1$ to $A_6$ are amplitudes of each frequency components, $K_p$ constant relating to light power and photoelectric transfer efficiency, $K_S$ constant of optical system sensitivity using the Sagnac-phase shift, $\Omega_{in}$ input angular velocity, $Km$ constant of phase modulation factor, $J_1(Km)$ to $J_6(Km)$ are constant obtained by Bessel function, $\omega$ frequency of the modulation signal $E_{10}$ or angular velocity of the modulation frequency, t time, and $\tau$ necessary time for passing the light wave to the optical fiber loop 4.

Hereunder, we will explain about formulae (1) to (6). The formula (1) denotes the first harmonic component of the modulation frequency, the formula (2) the second harmonic component of the modulation frequency. The formulae (3), (4), (5), and (6) denote the 3rd, 4th, 5th, and 6th modulation frequency components, respectively. In fact, the interference signal $E_{11}$ from the photoelectric transfer portion 6 can be denoted by infinite number of formulae. Suppose that the value of $Km$ is 3. The absolute value of $J_n(Km)$ obtained by Bessel function becomes small when the degree of the modulation frequency becomes higher. For instance, the 10th harmonic component of the modulation signal becomes one-twenty or thirty thousandth of the first harmonic component of the modulation signal. However, the high harmonic components of the modulation signal are useful information source in the phase modulation type optical fiber gyroscope which is demanded to be high accurate.

Referring to these formulae explained above, the input angular velocity $\Omega_{in}$ is included in all the formulae. All the frequency components of the interference signal $E_{11}$ are information source. When all the frequency components are used for calculating the input angular velocity, the most accurate input angular velocity will be obtained. Referring to the formulae in detail, it is understand that each amplitude of the odd harmonic components including the fundamental component of the modulation signal in formula (1), (3), or (5) is proportional to $\sin K_S \Omega_{in}$, each amplitude of the even harmonic components of the modulation frequency applied to the phase modulator 5 in formular (2), (4), or (6) is proportional to $\cos K_S \Omega_{in}$, and each phase in the formulae (1) to (6) is fixed to $(\omega t - \tau/2)$.

This means that by classifying the frequency components of the interference signal $E_{11}$ into the first component group which is proportional to $\sin K_S \Omega_{in}$ and the second component group which is proportional to $\cos K_S \Omega_{in}$, and detecting synchronously the first and second component groups, respectively; the first component group comprising even harmonic components including the fundamental component of the modulation frequency and the second component group comprising even harmonic components are obtained as the mixture signals, respectively. This is the gist of the present invention.

Figure 6A:
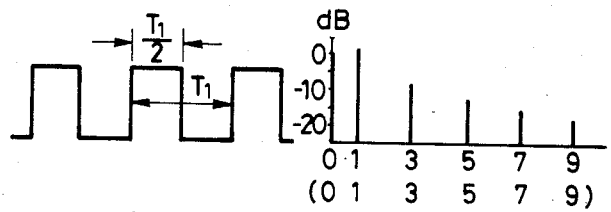
FIG. 6A and FIG. 6B are waveform diagrams of synchronous pulse voltages and spectra diagrams applied to synchronous detectors, respectively.

Hereunder, we will explain the means for detecting each mixture signal of the odd harmonic components and the even harmonic components of the modulation frequency. The synchronous detector 7a is a portion for detecting the first mixture signal of the even harmonic components including the fundamental component of the modulation frequency. The interference signal $E_{11}$ is detected synchronously, smoothed, and obtained the detected output signal $E_{12}$ as the mixture signal of the even harmonic components corresponding to the synchronous pulse voltage $E_7$ comprising even harmonic components including the fundamental component as shown in FIG. 6A, by forming the waveform of the synchronous pulse voltage $E_7$ into a rectangular wave having the relation of $P_1 = T_1/2$. Wherein, $P_1$ is a time width of a low level or a high level of the synchronous pulse voltage $E_7$, $T_1$ a period of the synchronous pulse voltage $E_7$.

Figure 6B:
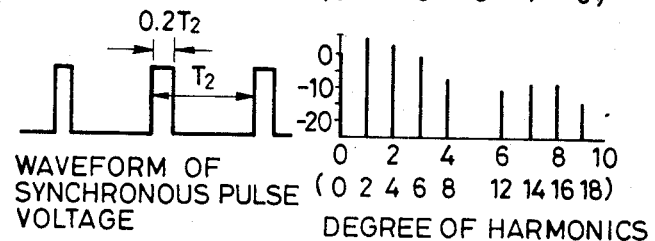

On the other hand, the synchronous detector 7b is a portion for detecting the second mixture signal of the odd harmonic components. The waveform of the synchronous pulse voltage $E_8$ is formed to the rectangular wave having the relation of $P_2 = 0.2 - 0.25T_2$, and $T_2 = 2$ as shown in FIG. 6B. By forming the waveform of the synchronous pulse voltage $E_8$ as explained above, each frequency component included in the synchronous voltage $E_8$ becomes even harmonic components of the modulation frequency as shown in the parentheses of FIG. 6B, so that the detected output signal $E_{13}$ becomes the mixture signal of the odd harmonic components.

Incidentally, the gain of the synchronous detection at each frequency does not become to 1, but becomes corresponding value of the amplitude of each frequency component of the synchronous pulse voltages $E_7$ and $E_8$. For instance, the amplitude of each frequency component of the synchronous pulse voltage $E_7$ becomes as follows: When the amplitude of the first harmonic component is one, the amplitude of the Nth harmonic component becomes 1/N.

Accordingly, the gain of the synchronous detection at each frequency becomes 1/N, when the frequency is the Nth harmonic. The interference signal $E_{11}$ is detected by these gain, and the detected output signal $E_{12}$ is obtained as the mixture value of the odd harmonic component including the fundamental component. On the other hand, the amplitude of each frequency component of the synchronous pulse voltage $E_8$ changes as well as that of the synchronous pulse voltage $E_7$ in such a manner that the amplitude becomes smaller when the frequency becomes higher, although the magnitude of the amplifier is not expressed simply since the amplitude is changed according to the pulse width shown in FIG. 6B. Although the gain of the synchronous detection is changed according to the magnitude of the frequency, there is no problem since the gain is stabilized.

Figure 7:
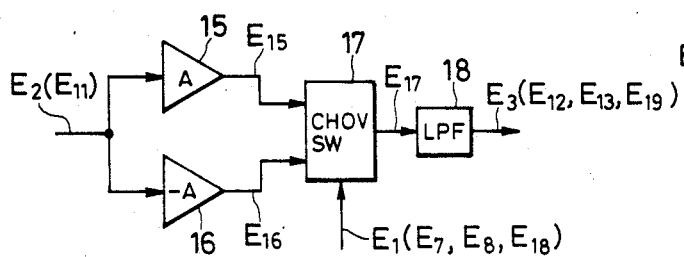
FIG. 7 is a block diagram of one embodiment of a synchronous detector.

Hereunder, we will explain the operation of the synchronous detectors $7a$, and $7b$. The output signal $E_{15}$ of the noninverting amplifier 20 and the output signal $E_{16}$ of the inverting amplifier 16 are changed over by the changeover switch 17 in synchronous with the synchronous voltages $E_7$, and $E_8$ of the rectangular waves as shown in FIG. 7. The operation of obtaining the detected outputs $E_{12}$, and $E_{13}$ from the input voltage $E_{11}$, is same to the operation of multiplying, or weighting by, the input voltage $E_{11}$ and the rectangular wave pulse voltage having plus and minus voltages which are removed a direct current component from the synchronous pulse voltages $E_7$ and $E_8$, and obtaining the multiplied voltage using analog multipliers. The frequency spectrum obtained by Fourier series expansion of the rectangular wave pulse voltage having plus and minus values and excluding a direct current component of the synchronous voltage, or the reference input, $E_7$ or $E_8$, is shown in right-hand of FIG. 6A, or 6B in which zero-order is removed. The multiplication by the analog multiplier explained above is carried out by multiplying two frequency components excluding a direct current component of frequency components included in the interference signal $E_{11}$ and the synchronous pulse voltages $E_7$, and $E_8$.

According to trigonometric function, the multiplication result is able to show as follows:

$$K_1 \sin(\omega_1 t - \phi_1) K_2 \sin(\omega_2 t - \phi_2) = \quad (7)$$

$$\frac{K_1 K_2}{2} [\cos\{(\omega_1 - \omega_2)t - (\phi_1 - \phi_2)\} -$$

$$\cos\{(\omega_1 + \omega_2)t - (\phi_1 + \phi_2)\}]$$

Wherein, $K_1$, and $K_2$ are amplitudes, $\omega_1$, and $\omega_2$ angular velocities, t time, and $\phi_1$, and $\phi_2$ phases.

Namely, when one of frequency components included in the interference signal coincides with one of frequency components included in the synchronous pulse voltage $E_7$, or $E_8$, the relation between $\omega_1$ and $\omega_2$ becomes as follows:

$$\omega_1 - \omega_2 = 0 - \quad (8)$$

$$\omega_1 + \omega_2 = 2\omega_1 \text{ or } 2\omega_2 - \quad (9)$$

When $\phi_1$ is equal to $\phi_2$, or $\phi_1$ and $\phi_2$ are same phase, a direct current component whose amplitude is $(K_1K_2/2)$, and an alternating component in which the amplitude is $K_1K_2/2$ and the angular velocity is $2\omega_1$ or $2\omega_2$, are obtained as the detecting output signal $E_{17}$.

When there are many coincident frequency components in the multiplication by the analog multiplier, each detecting output signal $E_{17}$ concerning each frequency component is same to the case in which an unitary frequency component included in the interference signal $E_{11}$ and the synchronous pulse voltage $E_7$, or $E_8$ is same to each other. The mixture value of the direct current components, in the case that there are many coincident frequency components in the multiplication explained above, becomes to the summed value of each direct current component in each frequency component. However, when $\phi_1$ is different from $\phi_2$ and the relation between $\phi_1$ and $\phi_2$ varies in each frequency component, the amplitude in each frequency component is not the term of $(K_1K_2/2)$ since the term of $\phi_1 - \phi_2$ is not always equal to zero.

Above explanation is in the case that the analog multiplier is used for the synchronous detector. The operation of the synchronous detectors shown in FIG. 7 is same to that of the analog multiplier. The detecting outputs $E_{12}$, and $E_{13}$ which are similar to direct currents, are obtained by smoothing the detected output signal $E_{17}$ by the low-pass filter 18 and removing all alternative components.

The detected outputs $E_{12}$, and $E_{13}$ are input to the numerical calculator 10 as the output signal $E_{20}$ through the changeover switch 8 and the numerical transfer portion 9. The output angular velocity $\Omega_{out}$ corresponding to the input angular velocity $\Omega_{in}$ is calculated in high accuracy by calculating according to the following formula (10) at the numerical calculator 10.

$$\Omega_{out} = K_x \tan^{-1}\left(\frac{E_{12}}{E_{13}} \times K_y\right) \quad (10)$$

Wherein, $K_x$, $K_y$ are compensation coefficients.

According to the embodiment explained above, almost all the signal procedures are taken place at the synchronous detectors $7a$, $7b$, so that the numerical calculator 10 is able to be in a small scale. Since a rectangular wave or rectangular waves are used for the synchronous signals or the reference inputs, high performance filters are not necessary for rectifying the waveform of the synchronous signals. However, the low-pass filter 13 has to be in high performance for obtaining the modulation signal $E_{10}$ to the phase modulator 5. Since no multiplier is used, there is no zero point fluctuation and no gain fluctuation. All the signal processing can be carried out by ordinal integrated circuits, so that the cost of the fiber gyroscope of the present invention can be decreased, and the response speed of the signal processing can be fast.

Figure 8:
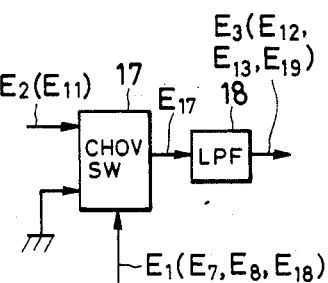
FIG. 8 is a block diagram of other embodiment of a synchronous detector.

Although the embodiment shown in FIG. 7 constitutes the synchronous detector 7a, or 7b by an noninverting amplifier 15, an inverting amplifier 16, and a changeover switch 17 for obtaining full wave rectification, the synchronous detector 7a, or 7b is not limited to the embodiment. For instance, as shown in FIG. 8, the synchronous detector 7a, or 7b can be formed by a half wave rectifier type synchronous detector in such a manner that the interference signal $E_{11}$ is applied directly to one input terminal of the changeover switch 17 and other input terminal thereof is earthed. The embodiment shown in FIG. 8 is formed by a simple circuit.

The synchronous detectors 7a, and 7b shown in FIG. 1 can be replaced by multipliers. However, the effect of the present invention is not lost by such a embodiment.

In the embodiment shown in FIG. 1, the interference signal $E_{11}$ is applied directly to the synchronous detectors 7a, and 7b. However, unnecessary frequency components, for example a direct current component or high harmonic components, can be removed by inserting a proper filter for obtaining high accuracy.

Figure 3:
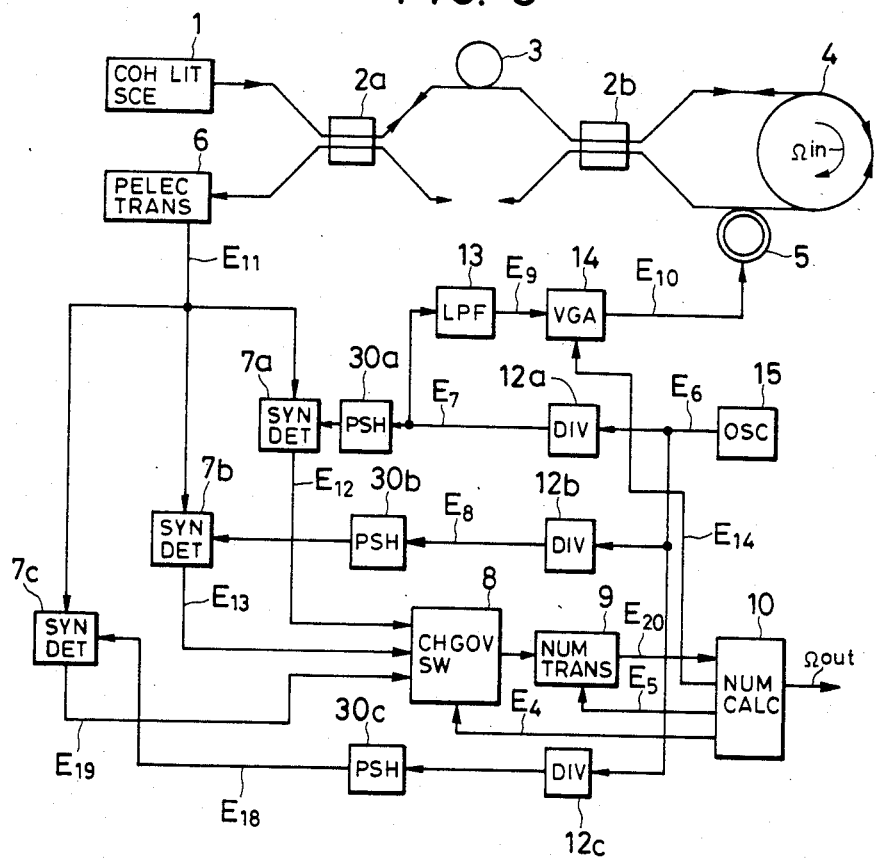
FIG. 3 is a block diagram of another embodiment of a phase modulation type optical fiber gyroscope of the present invention.

Referring to FIG. 3, a synchronous detector 7C is added for sensing even harmonic components larger than the third harmonic or sensing odd harmonic components larger than the 4th harmonic from the interference signal $E_{11}$. For obtaining even harmonic components larger than the third harmonic, the divider 12C outputs $E_{18}$ to the reference input port of the synchronous detector 7C. In this case, the divider 12C outputs twice frequency of the frequency of the divider 12a.

When the synchronous detector 7C is used for sensing odd harmonic components larger than the 4th harmonic from the interference signal $E_{11}$, the divider 12C outputs $E_{18}$ to the reference input port of the synchronous detector 7C. In this case, the divider 12C outputs twice frequency of the frequency of the divider 12b.

The output signal $E_{19}$ of the synchronous detector 7C is applied to the numerical calculator 10 through the changeover switch 8 and the numerical transfer portion 9.

In the embodiment shown in FIG. 3, the synchronous detector 7C is used for sensing even harmonic components larger than the third harmonic or sensing odd harmonic components larger than the 4th harmonic component of the modulation frequency of the phase modulator 5. However, the present invention is not limited to the embodiment shown in FIG. 3 in which one synchronous detector is disclosed. Namely, more than two synchronous detectors can be used instead of the single synchronous detector 7C for obtaining the synchronous detectors which are able to sense even harmonic components larger than the third harmonic and sense odd harmonic components larger than the 4th harmonic component from the interference signal $E_{11}$.

According to the present invention, the interference signal $E_{11}$ is classified into odd and even groups as already explained above. A ratio signal $E_{14}$ among the output signals from the synchronous detectors in odd group or among the output signals from the synchronous detectors in the even group is calculated at the numerical calculator 10. The ratio signal $E_{14}$ is used for controlling the modulation signal of the phase modulator 5. By controlling the ratio signal of $E_{19}/E_{13}$ to be constant by the voltage gain amplifier 14, the modulation signal $E_{10}$ is controlled so that the variation of the modulation operation by the phase modulator 5 is controlled to be small and finally the fluctuation of the output angular velocity $\Omega_{out}$ can be small and in high accuracy.

In the embodiment shown in FIG. 3, phase shifters 30a, 30b, and 30c are connected between the dividers 12a, 12b, 12c, and the synchronous detectors 7a, 7 b, 7c, respectively.

Although the first, second, and 4th harmonics are shown in sinusoidal waves, and the synchronous pulse voltages, $E_7$, $E_8$, and $E_{18}$ are shown in rectangular waves; these phase shifters are used for adjusting the mutual phases among the modulation signal and the reference signals in such a manner, for instance, $f_{E18\text{-}1}$, $f_{E18\text{-}2}$, $f_{E18\text{-}3}$ are coincided to $f_{4\text{-}1}$, $f_{4\text{-}2}$, $f_{4\text{-}3}$, respectively.

Figure 4:
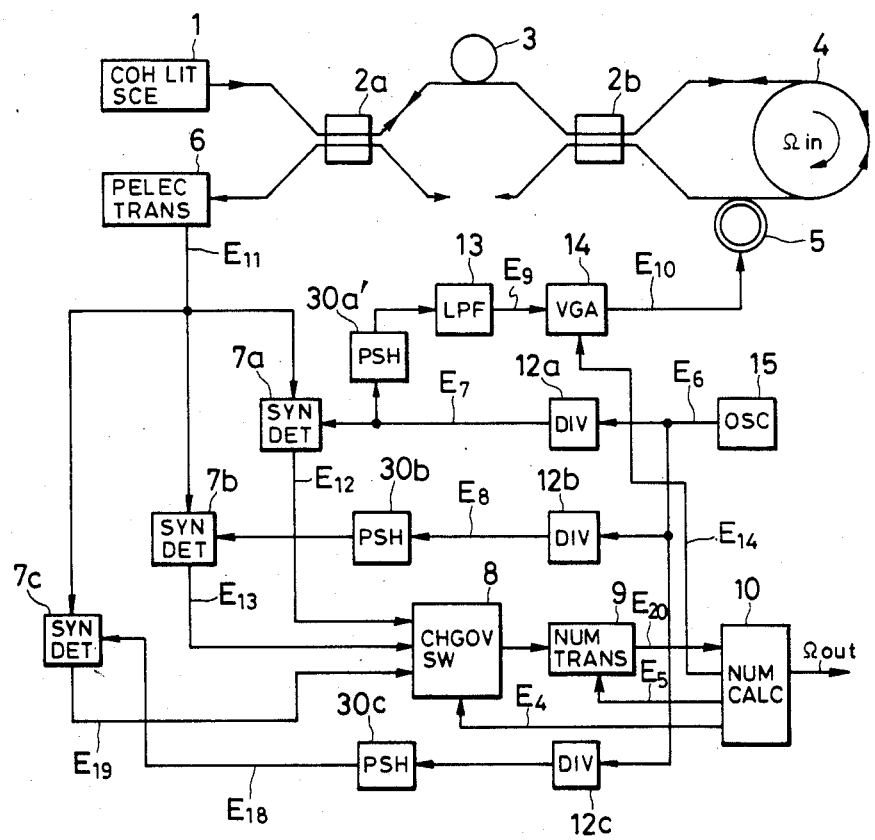
FIG. 4 is a block diagram of further another embodiment of a phase modulation type optical fiber gyroscope of the present invention.

Referring to FIG. 4, the fiber optic gyroscope of FIG. 4 is constituted to be similar to that of FIG. 3. However, in the embodiment of FIG. 4, the phase shifter $30a'$ is connected between the divider 12a and the lowpass filter 13 in place of 30a shown in FIG. 3. The phase shifter $30a'$ is used for a variable phase shifter adjusting the mutual phase between the modulation signal and one of the reference signals. The phase shifters 30b, and 30c are used for adjusting the mutual phases among the modulation signal and the reference signals.

According to FIG. 4, the phase adjustment is easily carried out by only adjusting the phase of the phase shifter $30a'$, since the phase shifters 30b, and 30c are adjusted their phases beforehand.

Figure 2:
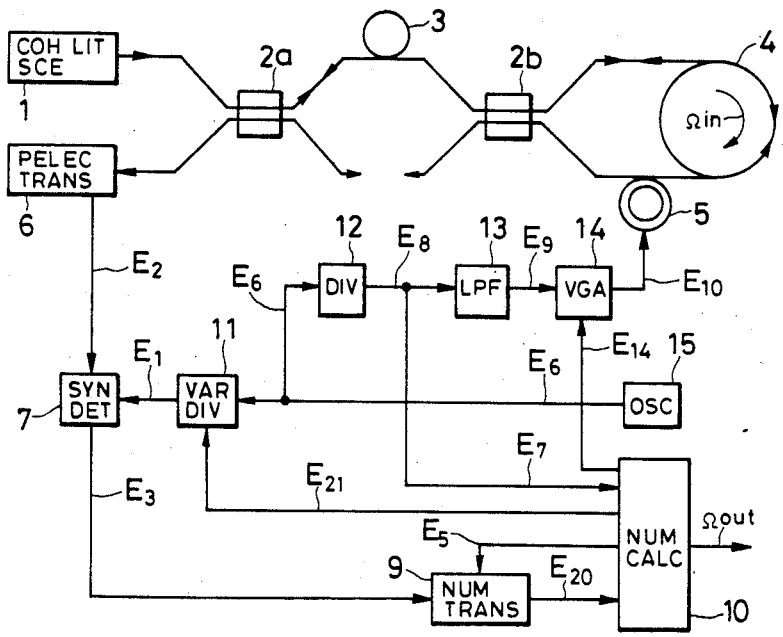
FIG. 2 is a block diagram of other embodiment of a phase modulation type optical fiber gyroscope of the present invention.

Referring to FIG. 2, a synchronous detector 7 is used instead of the synchronous detectors 7a, and 7b shown in FIG. 1. The variable divider 11 outputs the synchronous pulse voltage $E_1$ of the rectangular waves shown in FIGS. 6A and 6B by turns and sequentially by receiving changeover instruction signals $E_{21}$ of the rectangular waves from the numerical calculator 10. The synchronous detector 7 outputs the signal $E_3$ to the numerical calculator 10 through the numerical transfer portion 9.

The interference signal classified into odd and even groups in time sharing by the instruction of the reference signal $E_1$ is stored into memories (not shown) as data storage elements of the numerical calculator 10. The memories store the signals of the odd and even groups, respectively. The analog velocity $\Omega_{out}$ is calculated based on the signals of the odd and even groups.

According to the embodiment shown in FIG. 2, the fiber optic gyroscope is formed in more small size compared with other embodiments explained above.

What we claim is:

1. A phase modulation type fiber optic gyroscope which has an optical fiber system including an optical phase modulator driven with a modulation signal at a modulation frequency and detects an angular velocity processing an interference signal produced in the optical fiber system, comprising a number of signal generators which generate said modulation signal and reference signals whose frequencies are identical to said modulation frequency or integer multiplies of said modulation frequency;

a number of synchronous detectors which all have a pair of signal and reference input ports, and all input said interference signal and one of said reference signals as the signal and reference inputs, respectively, and are classified into odd and even groups of the synchronous groups, in which the synchronous detectors of the odd and even groups sense only the fundamental and odd harmonic components, and only the even harmonic components, respectively, of said modulation frequency from said interference signal with a certain weighting to the fundamental and harmonic frequency components;

a signal processing unit which inputs the output signals from said synchronous detectors and generates said angular velocity processing said output signals from said synchronous detectors.

2. A phase modulation type fiber optic gyroscope according to claim 1, wherein said angular velocity is obtained using ratios of said output signals from said synchronous detectors in said odd group to said output signals from said output signals from said synchronous detectors in said even group.

3. A phase modulation type fiber optic gyroscope according to claim 1, wherein said modulation signal is controlled using ratios among said output signals from said synchronous detectors in said odd group, or among said output signals from said synchronous detectors in said even group.

4. A phase modulation type fiber optic gyroscope according to claim 1, wherein said signal generators output a rectangular wave as said modulation signal.

5. A phase modulation type fiber optic gyroscope according to claim 1, wherein said signal generators output rectangular waves as said reference signals.

6. A phase modulation type fiber optic gyroscope according to claim 1, wherein a variable phase shifter is used for adjusting mutual phase between said modulation signal and one of said reference signals, and phase shifters with predetermined phase shift values are used for other reference signals and for adjusting the mutual phases among said modulation signal and said reference signals.

7. A phase modulation type fiber optic gyroscope which has an optical fiber system including an optical phase modulator driven with a modulation signal at a modulation frequency, and detects an angular velocity processing an interference signal produced in the optical fiber system, comprising a number of signal generators which generate said modulation signal and reference signals whose frequencies are identical to said modulation frequency or integer multiples of said modulation frequency;

a synchronous detector which has a pair of signal and reference input ports, and inputs said interference signal and said reference signals as the signal and reference inputs, respectively, classifies said interference signal into odd and even groups in time sharing, and senses selectively only the fundamental and odd harmonic components, and only the even harmonic components of said modulation frequency from said interference signal with a certain weighting to the fundamental and harmonic frequency components;

a signal processing unit which inputs the output signals from said synchronous detector, stores the signals of the odd and even groups to data storage elements, and generates said analog velocity based on the stored signal of the odd and even groups.

* * * * *